United States Patent

Thormann et al.

[11] Patent Number: 6,044,553
[45] Date of Patent: Apr. 4, 2000

[54] METHOD AND APPARATUS FOR REDUCING THE WEIGHT CRITICAL FLEXURAL AMPLITUDE OF A ROTOR HAVING ANISOTROPIC FLEXURAL STIFFNESS

[75] Inventors: Juergen Thormann, Roedermark; Dietmar Wiese, Rossdorf, both of Germany

[73] Assignee: Schenck RoTec GmbH, Darmstadt, Germany

[21] Appl. No.: 09/031,729

[22] Filed: Feb. 27, 1998

[30] Foreign Application Priority Data

Mar. 3, 1997 [DE] Germany .......................... 197 08 409

[51] Int. Cl.[7] .................................... B23P 15/00
[52] U.S. Cl. ........................................ 29/889.21; 29/889.1
[58] Field of Search .............................. 29/889.1, 889.21, 29/901; 73/460, 461, 462

[56] References Cited

U.S. PATENT DOCUMENTS

| | | | |
|---|---|---|---|
| 4,098,127 | 7/1978 | Shiga et al. | |
| 4,435,770 | 3/1984 | Shiohata et al. | 364/508 |
| 4,453,407 | 6/1984 | Sato et al. | 73/462 |
| 5,408,875 | 4/1995 | Matsushita et al. | 73/462 |
| 5,526,686 | 6/1996 | Fuchs et al. | 73/462 |
| 5,563,342 | 10/1996 | Drechsler et al. | 73/462 |
| 5,724,271 | 3/1998 | Bankert et al. | 73/462 |

FOREIGN PATENT DOCUMENTS

| | | |
|---|---|---|
| 422231 | 11/1925 | Germany . |
| 2407705 | 9/1974 | Germany . |
| 2644475 | 10/1977 | Germany . |

(List continued on next page.)

OTHER PUBLICATIONS

Gasch R. and Drechsler J.; Modales Auswuchten elastischer Läufer ohne Testgewichtssetzungen; VDI–Berichte Nr. 320, 1978, pp. 45–54.

Federn K.; Überblick über die gegenwärtigen Betrachtungsweisen, die Richtlinien und Normen und die gebräuchlichen Wege zum Auswuchten wellenelastischer Rotoren; VDI–Berichte Nr. 161, 1971, pp. 5–12.

Holdt H.–H.; Auswuchten elastisch nachgiebiger Rotoren; Werkstatt und Betrieb 105 (1972) 11, pp. 791–796.

Becker H.; Unwuchten in wellenelastischen Rotoren und ihr Ausgleich als wucht– und meβtechnisches Problem I; ATM Archiv für Technisches Messen, V 8224–8, Lieferung 289, Feb. 1960, pp. 27–30.

Becker H.; Unwuchten in wellenelastischen Rotoren und ihr Ausgleich als wucht– und meβtechnisches Problem II; ATM Archiv für Technisches Messen, V 8224–9, Lieferung 291, Apr. 1960, pp.73–76.

Wellenschwingungen von Turbosätzen, Grundlagen für die Messung und Beurteilung (Shaft Vibrations of Turbo sets, Principles for Measurement and Evaluation); VDI–Richtlinien, VDI 2059, Blatt 1, Nov. 1981 pp. 1–14.

*Primary Examiner*—I Cuda
*Attorney, Agent, or Firm*—W. F. Fasse; W. G. Fasse

[57] ABSTRACT

A method and apparatus quickly and reliably reduce the weight critical flexural amplitude of a flexible rotor having an anisotropic flexural stiffness. Rotor data including the midpoint deflection of a vibration at twice the rotational frequency are measured on the rotating rotor, and a mathematical model is developed, using the measured rotor data, to represent the rotor. Parameters in the dynamic equation of motion in the mathematical model are evaluated in connection with the actual measured data, and thereby the stiffness anisotropy of the rotor is determined by minimizing the difference between the model values and the actual measured values, for example by using the least squares method. Based on the determined anisotropy, compensating data such as machining data for machining the rotor in order to reduce the stiffness anisotropy are calculated. The rotor is machined in accordance with the compensating data, by boring blind holes or continuous through-going holes parallel to the rotational axis and intersecting the soft axis of the rotor. By providing symmetrically arranged pairs of bored holes, the rotational weight balance of the rotor is maintained while the flexural stiffness anisotropy is reduced.

24 Claims, 5 Drawing Sheets

FOREIGN PATENT DOCUMENTS

| | | |
|---|---|---|
| 3112188 | 1/1982 | Germany . |
| 3044440 | 6/1982 | Germany . |
| 4019721 | 1/1991 | Germany . |
| 3044440 | 9/1991 | Germany . |
| 54-150184 | 11/1979 | Japan . |
| WO95 33143 | 12/1995 | WIPO . |

METHOD AND APPARATUS FOR REDUCING THE WEIGHT CRITICAL FLEXURAL AMPLITUDE OF A ROTOR HAVING ANISOTROPIC FLEXURAL STIFFNESS

PRIORITY CLAIM

This application is based on and claims the priority under 35 U.S.C. §119 of German Patent Application 197 08 409.5, filed on Mar. 3, 1997. The entire disclosure of German Patent Application 197 08 409.5 is incorporated herein by reference.

FIELD OF THE INVENTION

The invention relates to a method for reducing the weight critical amplitude of flexural vibrations of a rotating rotor that has an anisotropic flexural stiffness. The invention further relates to an apparatus for carrying out such a method.

BACKGROUND INFORMATION

The trend in modern machine manufacturing is to achieve ever higher capacity and output of the machines, which generally calls for higher rotational speeds and an optimum utilization of materials in the machines. As a result, dynamic problems in the operation of the machines, which have previously only been considered of secondary importance, have now come into the foreground. For these reasons, it is now especially important to consider vibration and oscillation processes, such as imbalance vibrations and flexural bending vibrations, in the construction of shafts, rolls and other rotors that are intended to operate at high rotational speeds.

While mass imbalances have been addressed in the prior art, the occurrence of flexural bending vibrations due to anisotropy in the flexural stiffness characteristic of a rotating member have not been adequately taken into account. Such flexural bending vibrations are especially critical in shafts or other rotating members that are to be operated at a speed approaching the first critical bending speed or especially more than half of that critical speed. An example is represented by the calendar rolls and other rolls used in paper manufacturing, which are characterized as elastic shafts, i.e. the roll or shaft cannot be regarded as rigid but rather is elastically flexible over its length. If such a shaft or roll has even a slight anisotropy in its flexural stiffness, it will undergo a very strong vibration having a frequency of twice (2f) the rotational frequency, once the rotational speed of the shaft or roll reaches about one half of the first critical bending speed. In the field of rotor dynamics, this phenomenon is known as a so-called weight critical resonance or weight critical behavior.

Since this phenomenon is caused by the anisotropic flexural stiffness characteristic, it can occur even if the shaft or roll appears to be perfectly "round" and properly mass balanced. In other words, the weight critical resonance is caused by the resonant oscillation of the weight-induced sag or bending of the rotor, at twice the shaft rotation frequency. As an example, this phenomenon can be clearly understood in connection with a board that has a rectangular cross-section and that rotates about its lengthwise axis. Such a board will have a greater weight-induced sag when its major cross-sectional dimension is horizontal, and a lesser sag when its major cross-sectional dimension is vertical (i.e. when the board is upright on edge). Thus, if the sag is measured at the longitudinal midpoint of the board as the board rotates through one revolution, the midpoint sag will be smaller when the board is at angular positions 0° and 180° (board upright on edge) and greater when the board is at angular positions of 90° and 270°. As a result, the sagging or bending of the board will cause a bending vibration having a frequency of twice the rotational frequency.

Differences or anisotropies in the flexural stiffness of a rotor can arise due to any deviation from a perfectly round cross-section of the rotor, for example due to the presence of keyways, spline grooves, or other grooves or notches. This is true even if such grooves do not effect the rotational mass balancing of the rotor. In hollow shafts or other rotors, an anisotropy can also result if any area of the inner diameter is not perfectly concentric with the outer diameter, thus causing areas of lesser and greater relative rigidity. Anisotropies in the flexural stiffness can also arise in certain regions of a cast rotor due to the presence of different grain characteristics and thus different moduli of stiffness or elasticity in these regions, as may be caused by locally different cooling velocity during the production of shafts or rolls by casting. Generally, anisotropy in the overall flexural stiffness or rigidity of the rotor can arise from any source of deviations in the flexural strength and rigidity of the rotor in one plane relative to another plane.

PCT International Publication WO 95/33143 discloses a method for reducing the flexural rigidity fluctuation and the semi-critical disturbance occurring during the operation of a roll or cylinder, whereby the measured or calculated flexural rigidity fluctuation or imbalance is compensated by forming additional grooves or pockets or by changing the size of previously machined grooves or pockets. The grooves or pockets are to be so arranged that the combined effect thereof diminishes or at least does not increase the imbalance and/or the flexural rigidity fluctuation in the roll or cylinder. This reference suggests that the required measurements can be determined by measuring the motion of the center of the roll at the midsection thereof, or by measuring the circularity profile or the diametral fluctuation after carrying out the machining operation. However, the reference does not provide any teachings regarding how and under what conditions the measurements are to be carried out, nor any teachings regarding how any measurement results are related to or used for determining compensating steps that must be carried out. Since the reference provides no direct link between measurement results and the required compensating or corrective steps, it appears that an iterative process would be required, in which repeated measurements are carried out after repeated machining steps, in a trial and error manner, to finally hopefully achieve an acceptable compensation of the flexural rigidity fluctuation.

SUMMARY OF THE INVENTION

In view of the above it is the aim of the invention to provide a method and an apparatus for improving the dynamic behavior of a rotor by carrying out measurements on the rotor and then directly determining corrective or compensating steps that are required based on the measurements, and by carrying out those corrective or compensating steps to quickly and reliably reduce the anisotropy of the flexural stiffness of the rotor and thereby reduce the vibrations thereof having a frequency double the rotational frequency (so-called "2f vibrations"). The invention further aims to avoid or overcome the disadvantages of the prior art and to achieve additional advantages, as apparent from the present description.

The above objects have been achieved in a method for reducing the weight critical flexural amplitude of a rotor according to the invention, wherein pertinent rotor data are determined and a mathematical model is used in connection with the rotor data to characterize or define the rotatably supported rotor. Values or parameters in the equation of motion of the mathematical model are evaluated in connection with specific measured values of rotor deflection, and thereby the anisotropy of the rotor is determined and defined, preferably using the least squares method of data fitting. Once the anisotropy has been determined in this manner, then compensation date (e.g. machining data) are calculated based on either the known stiffness characteristics of the material of the rotor or the law of mechanics defining work. The machining data are then used, for example by a computer numerical controlled machining tool, to carry out a corrective or compensating machining of the rotor in order to reduce its stiffness anisotropy and thereby reduce the weight critical flexural amplitude of the rotor as it rotates. It should be understood that reduction of the anisotropy and the flexural amplitude should so to zero, i.e. complete elimination. This method can be carried out quickly and reliably, preferably as one direct procedure from the measurements to the final corrective machining, without requiring repetitive iterations of re-measuring and re-machining.

The above objects have further been achieved in an apparatus for reducing the weight critical flexural amplitude of a rotor according to the invention, including a sensor head for sensing a rotor index mark, a displacement pick-up or transducer for detecting and measuring the midpoint deflection of the rotor, a computer unit, and a measured value acquisition device having inputs connected to the sensor head and the displacement pick-up and having an output connected to the computer unit. The apparatus further includes a data unit for providing rotor specific data, which are supplied to an input of the computer unit. The computer unit outputs data that can be further processed or directly used by a computer controlled machining tool or the like to carry out a corrective compensation of the stiffness anisotropy of the rotor. The apparatus may include an axial boring tool connected directly to the computer unit.

Since a mathematical model is used to define the rotatably mounted rotor, and the values obtained through the mathematical model are combined and evaluated in connection with actual measured values of the rotor midpoint deflection, it is possible to determine the rotor anisotropy with only a single measuring run over various rotational speeds, and to generate machining data for correcting the anisotropy in a single machining operation directly from the measured data determined by such a single measuring run. Thus, as a major advantage of the invention, it is unnecessary to carry out an iterative sequence of plural measuring runs and corrective steps to reduce the anisotropy in successive intermittent partial steps by trial and error, as was carried out in the prior art.

Accordingly, the method according to the invention makes it possible to achieve a rapid and especially an exact compensation or correction of the stiffness anisotropy, whereby the double frequency (2f) midpoint deflections of the rotor can be held within a prescribed tolerance range using only a single measurement and single corrective machining step. This means that the rotor may be operated without any limitations on its rotational speed due to the weight critical resonance problem, which in turn means that the rotor, such as a roll used for paper, film or foil production, may be operated at a higher rotational speed and thereby achieve a higher production output, while simultaneously achieving a higher product quality due to the reduced vibrations of the roll.

Advantageously, the mathematical model to be used according to the invention may simply be based on an isotropically supported non-circular flexible Laval shaft with external damping. It has been determined by the inventors that even this simple model is adequate to achieve a substantially exact compensation or correction of the flexural stiffness anisotropy. The accuracy and the adaptability to various configurations of rotors are further improved according to the invention, if the model is based on a continuous rotor with modal analysis. In this context, the rotationally supported rotor is calculated by means of the finite element method, whereby the continuous rotor is modeled by a consecutive row of adjacent disks, in contrast to the Laval model of the rotor which includes a single disk. In connection with a modular decoupling, equations of motion are determined for the individual characteristic unit forms, of which the first characteristic unit form is preferably taken into consideration. The generalized stiffness characteristic of the rotor is a result value that is essential to the invention. The specific process steps that are valid for carrying out the inventive method in connection with the Laval model, principally also pertain for carrying out the method using the more detailed or fine-tuned model based on the continuous rotor.

A particularly simple method for determining the axes of greater and smaller flexural stiffness, i.e. the stiff axis and the soft axis, is the evaluation of an amplitude-phase diagram such as a Nyquist diagram. This can be carried out manually from a plotted diagram or may be carried out in a computer supported manner based on stored data values representing the diagram.

The final corrective or compensating step can be achieved by removing material or by adding material to the rotor, depending on the particular rotor type. It is also possible that both of these techniques can be used on a single rotor for correcting or compensating the anisotropy. Material removal is conveniently carried out by a machining operation such as boring, while material addition is conveniently carried out by attaching rod-shaped members by welding, soldering or the like, or any other known method of adding or building-up material. In any event, the material removal or material addition are carried out to correct or compensate the anisotropy of the flexural stiffness, while also maintaining the rotational mass balance of the rotor. In other words, the material removal and/or material addition must be carried out to correct the stiffness anisotropy.

More specifically, rotor material is to be removed in the plane of lower flexural stiffness (i.e. in a plane defined by the central axis and the soft axis), while material is to be added in the plane of greater flexural stiffness (i.e. the plane defined by the central axis and the stiff axis). The removal of material preferably comprises forming through-going continuous bores or closed blind bores equidistant from and parallel to the axis of the rotor in the plane of the smaller bending stiffness. The addition of material preferably comprises applying rod-shaped materials, onto the outer surface of the rotor or the inner surface of a hollow rotor, rotationally symmetrically in the plane of greater bending stiffness.

BRIEF DESCRIPTION OF THE DRAWINGS

In order that the invention may be clearly understood, it will now be described, in connection with an example embodiment of the invention, with reference to the drawings, wherein.

DETAILED DESCRIPTION OF PREFERRED EXAMPLE EMBODIMENTS AND OF THE BEST MODE OF THE INVENTION

Figure 1:
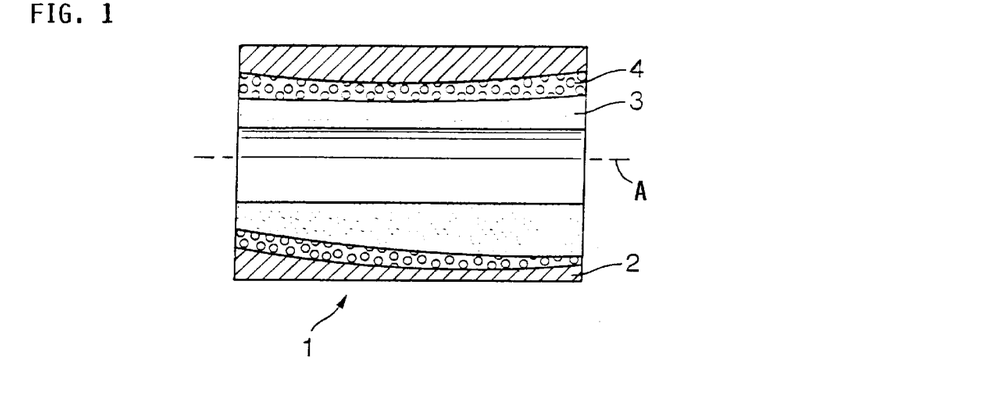
FIG. 1 is a schematic cross-section of a portion of a rotor in the form of a hollow roll that was manufactured by casting.

FIG. 1 schematically shows an example of a rotor in the form of a lengthwise extending hollow shaft 1, which has regions of differing grain characteristics resulting from the casting process by which the hollow shaft 1 was manufactured. This lengthwise extending hollow shaft 1 represents that part of a roll, such as a roll of a paper manufacturing plant, which primarily causes the flexural stiffness anisotropy of the roll. More specifically, the hollow shaft 1 is provided with end caps and bearing support studs or shaft stubs at both ends to form the complete roll.

As mentioned above, the hollow shaft 1 is formed by casting, and particularly by casting in a vertically standing orientation in an appropriate mold. During the casting process, the melt is caused to rotate in the mold as the mold is filled from bottom to top. Due to different rates of cooling of the melt, three different grain layers are formed, namely an outer chill cast or white cast layer 2 comprising cementite, an inner gray cast layer 3, and a transition layer 4 having a cementite content that increases from the inside to the outside, located between the outer layer 2 and the inner layer 3. Due to their different material compositions, these layers 2, 3 and 4 have respective different densities and moduli of elasticity. These layers also have varying thicknesses over the length of the shaft 1.

Moreover, the shaft 1 may become curved or deformed during its cooling and solidification, whereafter the shaft is machined by turning or the like on its inner and outer surfaces to form the finished shaft 1. This procedure can even further amplify the varying thickness of the three different layers 2, 3 and 4 along the length of the finished shaft 1. Thus, even the finished, turned hollow shaft 1 still has an anisotropy of its characteristics relative to the rotational axis A. If a hollow shaft or pipe is formed by deep drawing rather than by casting, anisotropies still result due to the varying wall thicknesses around the circumference and along the length of the finished pipe or shaft. Similarly, for carbon or glass fiber reinforced composite rotors, the processing of the material also leads to anisotropies in the finished rotor.

Since the anisotropy in the hollow shaft 1 shown in FIG. 1 arises due to the varying moduli of elasticity in the different layers 2, 3 and 4, the flexural stiffness and therewith the dynamic behavior of the finished hollow shaft 1 will also be anisotropic. In order to be able to correct such anisotropy and thus improve the dynamic behavior of the hollow shaft 1 according to the invention, the shaft and its dynamic behavior must first be modeled and mathematically described according to the method of the invention, as shown in an overview in FIG. 8, which will be described in detail below.

Figure 2A:
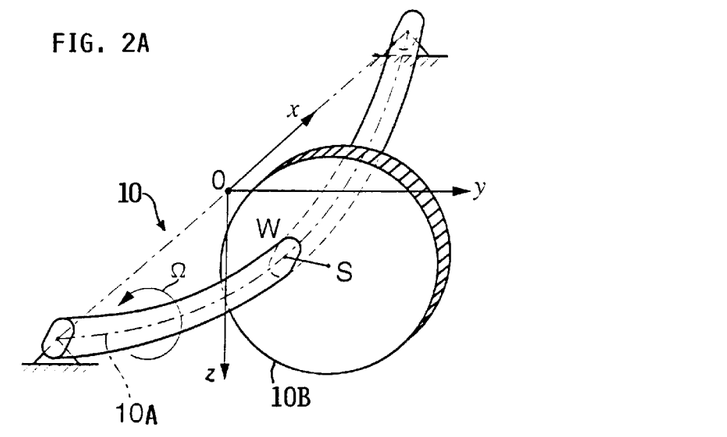
FIGS. 2A and 2B are schematic diagrams representing a mathematical model for characterizing the rotor of FIG. 1.
Figure 2B:
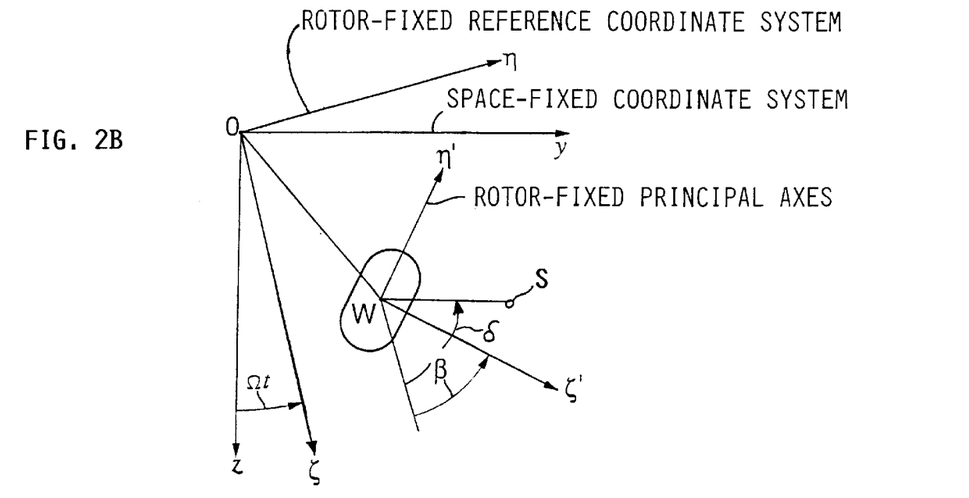

Particularly, equations of motion for the hollow shaft must be derived from the mathematical model. In the present example, for simplicity, a single-disk massless non-circular Laval shaft 10 is used as the mathematical model, as represented in FIGS. 2A and 2B. It should be understood, however, that other mathematical models can be used according to the invention, for example a continuous rotor analyzed in a modal manner. In that case, the rotatably supported rotor is calculated or analyzed by means of finite element analysis, whereby the continuous rotor is modeled by a sequence of disks, in contrast to the single disk of the Laval rotor model. For a modular decoupling, equations of motion are determined for the individual characteristic unit forms, of which the first characteristic form is preferably taken into consideration. The generalized stiffness characteristic of the rotor or shaft is a result value essential to the invention. The process steps and considerations pertaining to an evaluation of the Laval model principally also pertain for the more detailed or fine-tuned model based on a continuous rotor. For the sake of simplicity, the process steps for carrying out an evaluation using the Laval model will now be described in detail.

As shown in FIG. 2A, the Laval model shaft 10 includes a massless shaft 10A and a rotor disk 10B having the mass m attached rigidly and eccentrically to the shaft 10A. The rotor disk 10B has a center of mass S, while the shaft 10A passes through the disk 10B at a shaft connection point W offset from the center of mass S to define the eccentricity. The non-circular shaft 10A has two perpendicular principle axes of inertia that respectively have two different flexural stiffness coefficients $c_1$ and $c_2$ associated therewith, so that the Laval shaft 10 has a flexural stiffness anisotropy $\mu$ that is defined as described below. The evaluation is carried out for a stationary rotational condition, namely the rotational condition with constant angular velocity $\Omega$. In order to simplify the mathematical analysis in the complex plane, two coordinate systems will be used, namely a space-fixed coordinate system yz lying in the central plane of the rotor disk, and a rotor-fixed coordinate system $\eta\zeta$ which rotates together with the rotor. The shaft connection point w at which the undeformed shaft 10A would pass through the disk 10B, i.e. the true axis of rotation, is chosen as the origin, as shown in the schematic of FIG. 2A and in the enlarged space diagram of FIG. 2B. For simplicity, FIG. 2B simply shows a cross-section through the shaft 10A at the point w of its intersection with the disk 10B.

The axes $\eta'$ and $\zeta'$ represent the principle inertial axes, which generally do not coincide with the rotor-fixed reference system. Instead, considered generally, the system of perpendicular principle inertial axes $\eta'$ and $\zeta'$ is shifted by an angle of $\beta$ from the rotor-fixed reference coordinate system $\eta\zeta$. Moreover, the center of gravity S of the rotor disk 10B is offset or rotated by an angle $\delta$ relative to the rotor-fixed, i.e. rotating, reference coordinate system $\eta\zeta$. For simplicity of calculation, the rotor-fixed reference coordinate system $\eta\zeta$ can be assigned so that it corresponds to the principle inertial axes $\eta'$ and $\zeta'$.

The first step of the analysis will be to define and evaluate the deflection of the Laval shaft 10 from its undeformed axis, i.e. the x axis of the coordinate system. The vectors of the deflections in the yz plane and in the $\eta\zeta$ plane respectively are given by:

$$r = y + j\,z \qquad \text{Eq. (1)}$$

$$\rho = \eta + j\cdot\zeta \qquad \text{Eq. (2)}$$

with the transformation conditions $$r = \rho \cdot e^{j\Omega t} \qquad \text{Eq. (3)}$$

$$\rho = r\cdot e^{-j\Omega t} \qquad \text{Eq. (4)}$$

The corresponding differential equation is derived according to the d'Alembertian principle (requiring equilibrium between the kinetic or inertial forces and the external applied forces):

$$m\cdot \ddot{r} = F_f + G \qquad \text{Eq. (5)}$$

wherein $F_f$=elastic return force in the fixed system; and

B=the self weight.

When transformed into the rotating coordinate system, the result is:

$$m(\ddot{\rho} + 2j\Omega\dot{\rho} - \Omega^2\rho) = F_{rot} - j\cdot m\cdot g\cdot e^{-j\Omega t} \qquad \text{Eq. (6)}$$

wherein $F_{rot} = -c_1\eta - jc_2\zeta$; and $c_1, c_2$=flexural stiffness coefficients.

By applying certain substitutions or abbreviations, namely $$\omega_1^2 = \frac{c_1}{m}$$

$$\omega_2^2 = \frac{c_2}{m}$$

$$\omega_0^2 = \frac{c_1 + c_2}{2m}$$

wherein $\omega_1$, $\omega_2$=characteristic or Eigenfrequencies of the shaft, $\omega_0$=average Eigenfrequency of a shaft having an average flexural stiffness coefficient, and by further substituting, simplifying, and transforming, the equation of motion is represented in the following form for describing the resultant translational motion of the rotor disk 10B due to its own weight:

$$\rho'' + 2\cdot j\cdot\eta\cdot\rho' + (1-\eta^2)\rho - \mu\cdot\bar{\rho} = -\frac{j\cdot g}{\omega_0^2}e^{-j\eta t} \qquad \text{Eq. (7)}$$

wherein $$\eta = \frac{\Omega}{\omega_0} = \text{reference rotational speed}$$

$$\mu = \frac{c_2 - c_1}{c_1 + c_2} = \frac{\omega_2^2 - \omega_1^2}{2\omega_0^2} = \text{degree of anisotropy}$$

From this, the complex amplitudes $\rho_1$ and $\rho_2$ are given as follows:

$$\rho_1 = \frac{j\cdot g}{\omega_0^2}\cdot\frac{\mu}{1-\mu^2-4\eta^2} \qquad \text{Eq. (8)}$$

$$\rho_2 = -\frac{j\cdot g}{\omega_0^2}\cdot\frac{1-4\eta^2}{1-\mu^2-4\eta^2} \qquad \text{Eq. (9)}$$

Under the influence of an externally applied damping D, the complex amplitudes $\rho_1$ and $\rho_2$ are thus given as follows:

$$\rho_1 = \frac{g}{\Delta_g\cdot\omega_0^2}[4\cdot D\cdot\mu\cdot\eta + j\mu(1-\mu^2-4\eta^2)] \qquad \text{Eq. (10)}$$

$$\rho_2 = \frac{g}{\Delta_g\cdot\omega_0^2}[-4D\mu^2\eta - j\{(1-4\eta^2)(1-\mu^2-4\eta^2) + 16D^2\eta^2\}] \qquad$$

wherein $$\Delta_g = (1-\mu^2-4\eta^2)^2 + 16D^2_\eta{}^2 \qquad \text{Eq. (11)}$$

Figure 3:
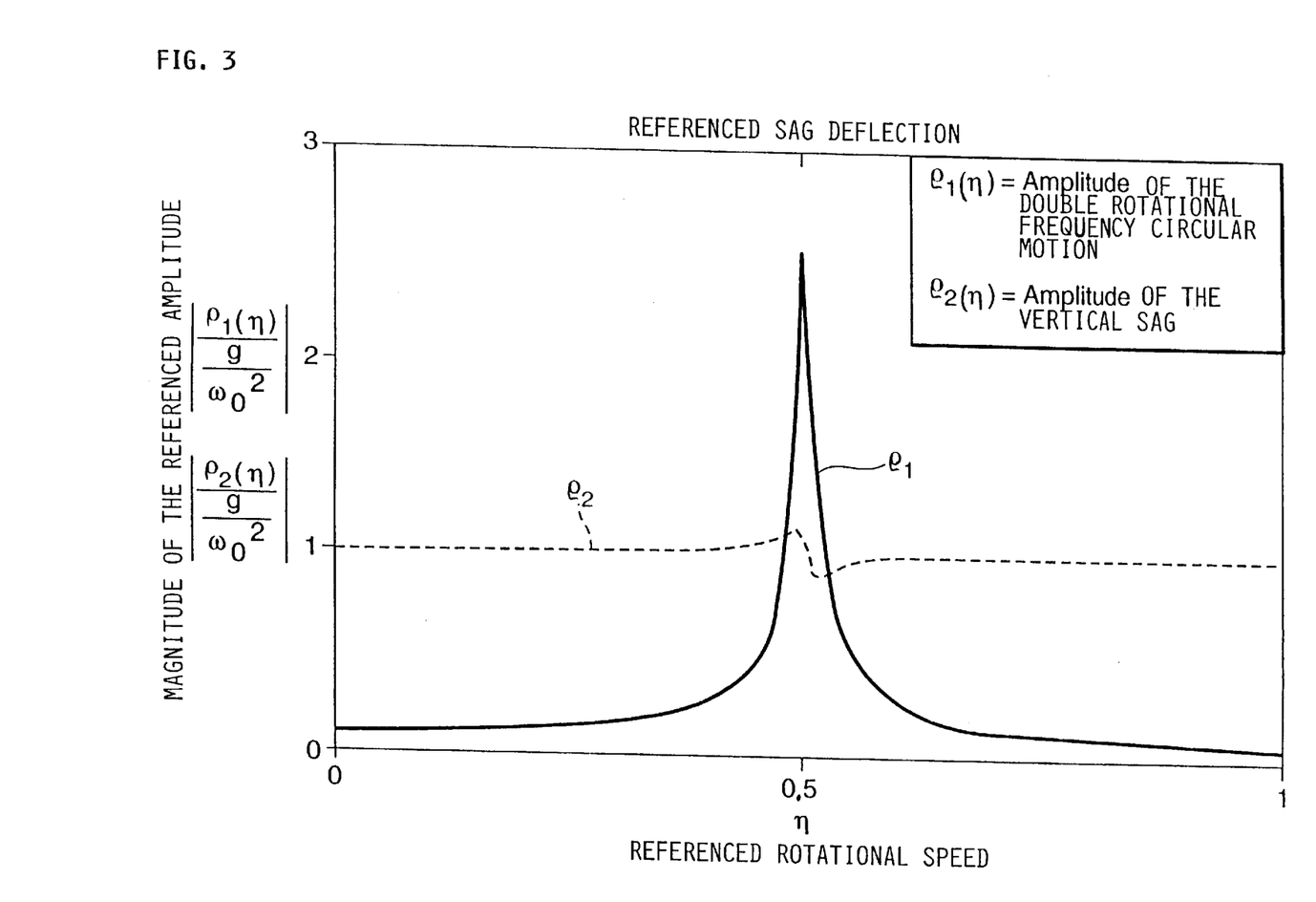
FIG. 3 is a diagram showing the progression of the weight-induced double frequency vibration amplitudes relative to the reference rotational speed of the shaft with external damping.

The contributions of the complex amplitudes $\rho_1$ and $\rho_2$ over the reference rotational speed are shown in FIG. 3, whereby $\rho_1$ is the amplitude of the circular motion having a doubled frequency (2f) relative to the rotational frequency, and $\rho_2$ is the amplitude of the vertical sag or deflection. The variation in the sag or deflection $\rho_2$ upon reaching the weight critical rotational speed results from a superposition of the constant weight-induced sagging deflection and the flexing vibration or oscillation of the non-circular rotating shaft. The amplitude $\rho_1$ of the double frequency (2f) circular motion has a maximum value at a rotational speed corresponding approximately to one half of the first critical bending speed.

Figure 4:
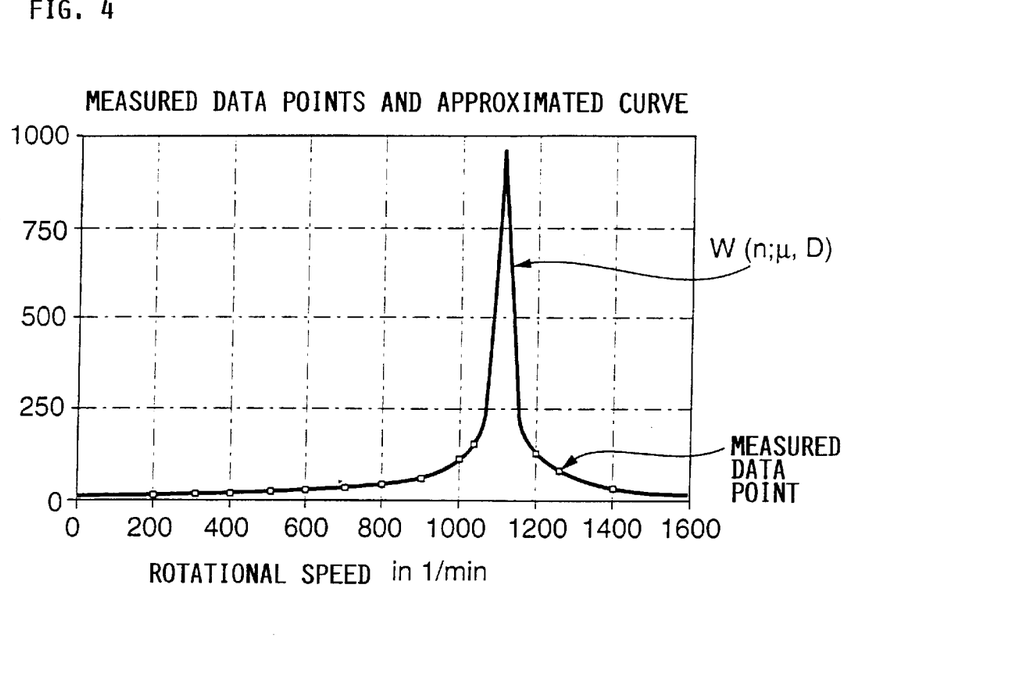
FIG. 4 is a Bode diagram showing measured values and a fitted or approximated curve of the midpoint deflection of the rotor relative to the rotational speed of the rotor.

FIG. 4 is a Bode diagram illustrating or exemplifying the process for identifying the parameters used according to the present invention, as will be described in detail below. Specifically, FIG. 4 is a diagram showing the midpoint deflection of the rotor over a range of rotational speeds, by means of actual measured data points as well as an approximated or fitted curve based on those measured data points. The following points pertain in general to the estimation or evaluation and identification of the parameters. The rotor system is a particularly dynamic system from which measured values are acquired to characterize the system behavior, on the one hand. Furthermore, on the other hand, the inventive method provides a mathematical model of the system, in which one or more parameters are unknown or known only approximately with a large degree of possible error.

According to the invention, the measured values are compared to, and used to evaluate, corresponding results provided by the mathematical model. Differences between the computationally determined values and the actually measured values are taken into account as estimation errors. The unknown parameters are to be determined in such a manner that the estimation errors are minimized. In order to determine whether a minimum in the estimation errors has been achieved, a control or optimality criterion must be selected and applied. In the present example, the sum of least squares method is used as the optimality criterion, whereby the sum of squares of the estimation errors is to be minimized. The mathematical model provides a general parameter dependent function $F(x, \alpha, \beta, \ldots)$ of the parameters $(\alpha, \beta, \ldots)$, which is to approximate the initial value f. The measured values $f_1$, $x_i$ of the function f describing the system are acquired by measurement techniques, whereby $i=1, \ldots k$ indicates the respective one of a number k of measured data points.

The sum of the squares of the errors is then given by $$Q_s(\alpha, \beta, \ldots) = \sum_{i=1}^{k} [f_i - F(x_i, \alpha, \beta, \ldots)]^2 \qquad \text{Eq. (12)}$$

which is to be minimized.

The following text describes one possible solution in which the values or magnitudes of the anisotropy and of the damping are determined. The above described optimization problem can be solved using any one of a number of commercially available software products, such as "MATHCAD"™ or "MATHLAB" or others for carrying out mathematical calculations or optimizations. Such commercially available software products can determine additional values as well.

By inserting or substituting:

$$\eta = \frac{\Omega}{\omega_0} = \frac{2 \cdot \pi \cdot n}{60 \cdot \omega_0} \qquad \text{Eq. (13)}$$

$$\Delta_g = (1 - \mu^2 - 4\eta^2)^2 + 16D^2\eta^2$$

into the above recited Equation (10) for $\rho_1$, for the mathematical model selected according to the invention, one obtains the following function W that is dependent on the parameters $\mu$ and D as shown in FIG. 4:

$$W(n, \mu, D) = \frac{g\sqrt{\frac{4}{225}D^2\mu^2\pi^2\frac{n^2}{\omega_0^2} + \mu^2\left(1 - \mu^2 - \frac{1}{225}\pi^2\frac{n^2}{\omega_0^2}\right)^2}}{\omega_0^2\left(\left(1 - \mu^2 - \frac{1}{225}\pi^2\frac{n^2}{\omega_0^2}\right)^2 + \frac{4}{225}D^2\pi^2\frac{n^2}{\omega_0^2}\right)} \qquad \text{Eq. (14)}$$

as well as the equation or relationship that is to be optimized:

$$Q_s(\mu, D) = \sum_{i=1}^{k} [w_i - W(n_i, \mu, D)]^2 \Rightarrow \underline{\text{MIN}} \qquad \text{Eq. (15)}$$

wherein $w_i$ indicates the measured amplitudes at the respective associated rotational speeds $n_i$, as indicated by the squares in FIG. 4.

Thus, stated simply, both the damping D and the coefficient of anisotropy $\mu$ of a rotor are identified or determined according to the invention by combining and evaluating the values provided by a mathematical model (a Laval shaft model in the selected example) in connection with measured values determined from the actual physical rotor, by using the above described method of parameter estimation. Instead of using the above described method, it is alternatively possible to solve the optimization problem by means of the complex measured values, in other words by using the values plotted in the Nyquist diagram of FIG. 5 rather than the Bode diagram of FIG. 4.

Once the anisotropy of the rotor has been determined as described above, the remaining step is to compensate or correct that determined anisotropy. Namely, proper manipulations or adjustments on the hollow shaft 1 or other rotor must be carried out in order to significantly reduce or remove the determined anisotropy. More specifically, the determined anisotropy is reduced or removed by altering the flexural stiffness characteristics of the rotor 1 by introducing an inverse or counteracting anisotropy. To achieve this, it is most effective to manipulate the rotor, i.e. to remove material from or add material to the rotor, along the principle inertial axes thereof.

Figure 6A:
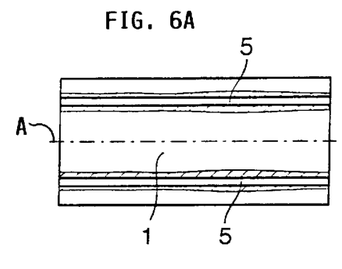
FIG. 6A is a side view of a rotor, partially broken open in section, showing through-going bored holes for compensating the anisotropy according to the invention.
Figure 6B:
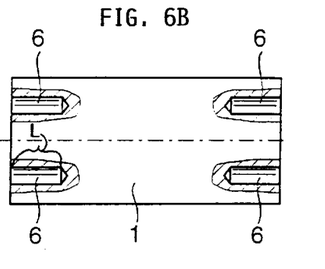
FIG. 6B is a side view of a rotor, partially broken open in section, showing blind bored holes extending inwardly from the ends of the rotor for compensating the anisotropy according to the invention.
Figure 6C:
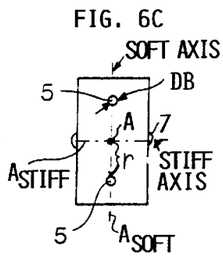
FIG. 6C is a schematic end view diagram figuratively demonstrating the soft axis and the stiff axis of the rotors of FIGS. 6A and 6B.

A simple method for achieving this is to bore through-going holes 5 through the rotor 1 on or intersecting the soft axis $A_{soft}$ so that the stiffness of the rotor 1 about the stiff axis $A_{stiff}$ is reduced to such an extent that it matches the stiffness of the rotor 1 about the soft axis $A_{soft}$, as shown in FIGS. 6A and 6C. Alternatively, non-through-going or blind bored holes 6 can be provided extending parallel to the rotational axis A from one end face or preferably both end faces of the rotor 1, respectively on lines intersecting the soft axis $A_{soft}$ at a spacing r away from the stiff axis $A_{stiff}$, as shown in FIGS. 6B and 6C. It should be noted that the bored holes 5 or 6 are always provided in rotationally symmetrically arranged pairs to maintain the rotational mass balance of the rotor 1. It should further be noted that the rectangular end view shown in FIG. 6C is merely a schematic representation to more clearly demonstrate the concept of the soft axis $A_{soft}$ and the stiff axis $A_{stiff}$, while the rotor 1 actually has an essentially circular cross-section with different stiffness characteristics along the soft axis and stiff axis as described above in connection with FIG. 1.

Instead of providing bored holes 5 or 6, it is alternatively possible to remove material from the outer surface of the rotor 1, such as by machining grooves therein, on the soft axis $A_{soft}$. As a further alternative, instead of removing material, it is possible to apply additional material in the form of a rod or bead, either on the outer surface or the inner surface of the hollow shaft rotor 1, in parallel to the shaft axis A and on the stiff axis $A_{stiff}$, in order to reduce the stiffness anisotropy by increasing the stiffness about the soft axis $A_{soft}$. Such a rod-shaped additional material 7 is indicated schematically in FIG. 6C.

Figure 5:
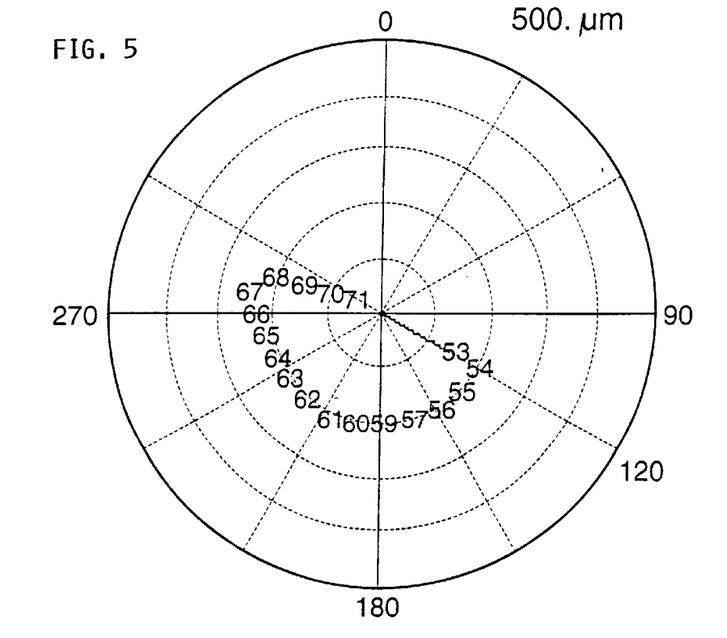
FIG. 5 is a Nyquist diagram showing measured data points for determining the axes of greater bending stiffness and lower bending stiffness.

The angular positions of the stiff axis $A_{stiff}$ and the soft axis $A_{soft}$ the hollow rotor shaft 1 may, for example, be determined by means of an amplitude-phase diagram, e.g. a Nyquist diagram, representing the measurement values of the double frequency (2f) midpoint deflections of the hollow rotor shaft 1 rotating at about one half of the first critical bending speed. FIG. 5 is such a Nyquist diagram showing a plurality of measured data points respectively representing the amplitude of the deflection relative the angular phase around one full rotation, with a maximum deflection range of 500 $\mu$m. In order to determine the angular position of the stiff axis, first the phase direction of the initial drifting or deviation of the hollow shaft 1 from its true circular rotation is read from the phase diagram. The deflection of the hollow shaft 1 in this angular direction indicates that the primary stiff axis of the hollow shaft lies in this direction, because the shaft is bending about the soft axis which is perpendicular to the stiff axis.

In the present example as seen in FIG. 5, the direction of this initial deflection, represented by the first fifty measurement points, is at about 120° it must further be taken into account that the determined angular value must be divided by two, to result in an angular position of the stiff axis at 60°, since this evaluation involves double frequency (2f) measured values that correspondingly have a frequency double that of the rotational frequency. Accordingly, it has been determined that the stiff axis lies at a position of 60°, while the soft as lies at a position of 150°, i.e. perpendicularly to the stiff axis. These angular positions are determined relative to an index position or index mark on the shaft, as will be described below in connection with FIG. 8.

Figure 7A:
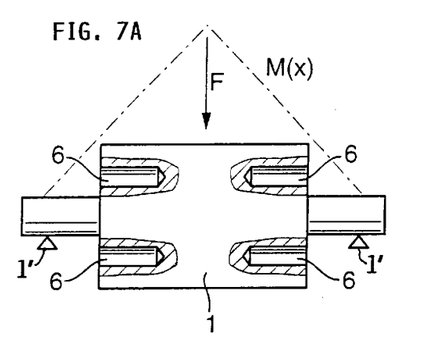
FIGS. 7A and 7B are two schematic side views of a rotor, illustrating examples of calculating the anisotropy reduction according to the invention.
Figure 7B:
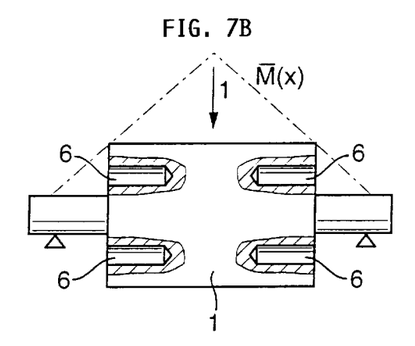

Once the angular positions of the stiff axis and of the soft axis and the amount of anisotropy have been determined, the next step is to determine the proper bore diameter DB, a radial spacing r of the bored holes relative to the stiff axis $A_{stiff}$, and the proper bore depth or length L in the case of blind bores 6. This determination will now be briefly discussed with regard to a rotor that is symmetrical about its center plane and also symmetrically rotatably supported, wish reference to FIG. 7. This determination is, for example, based on evaluation of the Laval shaft model in view of the general mechanics law or definition of work. In order to carry this out, the data values of thickness and moduli of elasticity of the rotor are taken into account, as listed under the point "geometry" in the method diagram of FIG. 8. The sagging deflection S is calculated by means of the mechanical definition of work. As schematically represented in FIGS. 7A and 7B, a force F or virtual force 1 is applied at the midpoint of the shaft 1 between the two bearings 1'. As a result, the moment distributions M(x) and $\overline{M}(x)$ indicated schematically in FIGS. 7A and 7B arise along the shaft 1, whereby the sagging deflection S can be calculated using the so-called work integral:

$$S = \int \frac{M(x) \cdot \overline{M}(x)}{E(x) \cdot I(x)} dx \qquad \text{Eq. (16)}$$

wherein

M(x)=moment due to force F $\overline{M}(x)$=moment due to force 1

E(x)=average modulus of elasticity

I(x)=surface moment of inertia in the respective principle action direction.

Next, for M(x)=$\overline{M}(x)$F, the stiffness C is calculated as:

$$C = \frac{1}{\int \frac{\overline{M}(x)^2}{E(x) \cdot I(x)} dx} \qquad \text{Eq. (17)}$$

If the rotor is made up of several elements, for example various regions or portions having different diameters, then the denominator of the above Equation 17 must be replaced by the sum of the work integrals of the various rotor elements.

The products of the respective modulus of elasticity and surface moment of inertia in the case in which the rotor element does not include bored holes, are equal for both principle axis directions and are given as follows:

$$E(x) \cdot I_1(x) = E(x) \cdot I_2(x) = \frac{\pi}{64} \cdot (D_a^4 - D_i^4) \cdot E \qquad \text{Eq. (18)}$$

wherein $D_a$ is the outer diameter and $D_i$ is the inner diameter. If a rotor element is provided with bored holes 6 as shown in FIGS. 7A and 7B, then two different products of the respective modulus of elasticity and the surface moment of inertia will apply for the two principle axis directions, and namely, according to Steiner:

$$E(x) \cdot I_1(x) = \frac{\pi}{64} \cdot (D_a^4 - D_i^4) \cdot E - 2 \cdot \pi \cdot \left( \frac{DB^4}{64} + \frac{DB^2}{4} \cdot r^2 \right) \cdot E_B \qquad \text{Eq. (19)}$$

$$E(x) \cdot I_2(x) = \frac{\pi}{64} \cdot (D_a^4 - D_i^4) \cdot E - 2 \cdot \pi \cdot \frac{DB^4}{64} \cdot E_B \qquad \text{Eq. (20)}$$

wherein:

DB=bore diameter r=radial spacing between bore axis and rotor center $E_B$=modulus of elasticity of the material in which the bores are provided.

Due to the different products of the modulus of elasticity and the surface moment of inertia, this will result in different coefficients of stiffness $c_1$ and $c_2$ in the two principle axis directions so that the shaft would be made anisotropic due to the provision of the bored holes (assuming that the initial condition was isotropic), whereby the above mentioned relationship between the anisotropy $\mu$ and the coefficients of stiffness $c_1$ and $c_2$ applies (see the definitions in connection with Equation 7 above).

Thus, the desired proper bore diameter is directly connected to the identified anisotropy of the rotor. In other words, the proper diameter DB must simply be selected so that the anisotropy caused by providing the bored holes counteracts or cancels out the anisotropy that originally existed in the anisotropic rotor. This bore diameter DB is calculated in the computer unit shown in FIG. 8, using the above described calculations and methods. Additionally, the radial spacing distance r at which the bored holes 6 are to be provided must also be determined. By positioning the bored holes 6 on the soft axis $A_{soft}$ at a spacing r away from the stiff axis $A_{stiff}$ in an anisotropic shaft, then the stiff axis will be weakened to a greater extent than is the soft axis, so that the previously existing anisotropy of the shaft can be cancelled out or compensated by the newly caused anisotropy by properly selecting the bore diameter DB and the radial spacing r.

Figure 8:
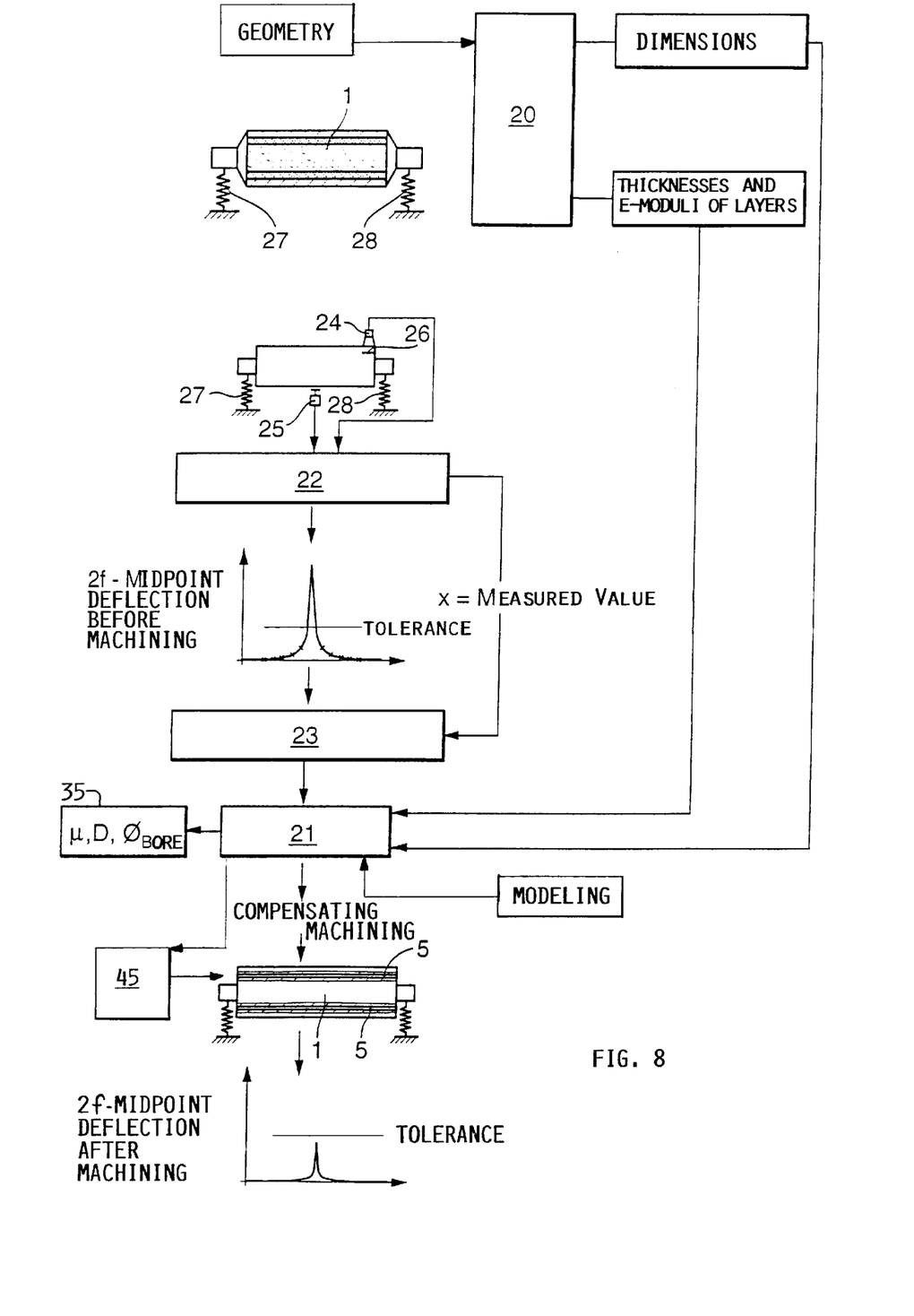
FIG. 8 is a schematic block diagram illustrating the apparatus and the sequence of steps for carrying out the method according to the invention.

FIG. 8 provides a schematic overview of the components of an apparatus for carrying out the present method, as well as a flow diagram of the steps involved in carrying out the method. The rotor 1 is rotatably supported on two bearing stands 27 and 28. A data acquisition unit 20 is provided for acquiring, obtaining or determining the geometrical data pertaining to the geometry of the rotor 1, and specifically containing the dimensions of the rotor 1 as well as the associated moduli of elasticity and thicknesses of the layers 2, 3 and 4 in the structure of the rotor 1. These values are provided to a computer unit 21, which forms a mathematical model of the rotatably supported rotor 1. These values could alternatively be manually determined and input into the computer unit 21.

A deflection measuring device 22 is provided to measure the rotational speed, phase angle, and 2f or double frequency midpoint deflection of the rotor 1, and to provide corresponding measured values to a measured value acquisition device 23 connected to the output of the device 22. Appropriate filtering may be used to isolate the 2f deflection values. The device 23 provides corresponding measured values for the rotational speed, phase angle, and double frequency or 2f midpoint deflection to the computer unit 21, which in turn determines the axis positions of the rotor 1, and the complex anisotropy µ in terms of its magnitude and phase, among other things, by carrying out the above described process of parameter identification.

Next, taking into account the geometric data provided by the data acquisition unit 20, the computer unit 21 finally determines and indicates the specific material removal or addition that must be carried out in order to compensate or reduce the anisotropy that is initially present in the rotor 1. For example, the computer unit indicates or outputs data defining the bore diameter DB and radial spacing r of through-going bore holes 5 or additionally the bore hole depth or length of blind bore holes 6. The computer unit 21 provides the above described output signals to a display unit 35 and optionally also directly to a computer controlled machining station, for example including an axial boring machine 45.

The deflection measuring device 22 comprises a contactless displacement pick-up or transducer 25, preferably using an eddy current sensor, for detecting the vertical midpoint deflection of the rotor 1, as well as a sensor head 24 for sensing a rotor index mark 26 provided on the rotor 1. Thus, the sensor head 24 provides information regarding the rotational or angular position and the rotational speed of the rotor 1. The output signals of the sensor head 24 and the displacement pick-up 25 are provided to the deflection measuring device 22 proper, which in turn therefrom determines rotational speed dependent measured values of the amplitude of the 2f midpoint deflection of the rotor 1 relative to the rotational angular position, which are then passed on to the measured value acquisition device 23, whereupon all of this information is conveyed on to the computer unit 21 for its use.

Figure 9:
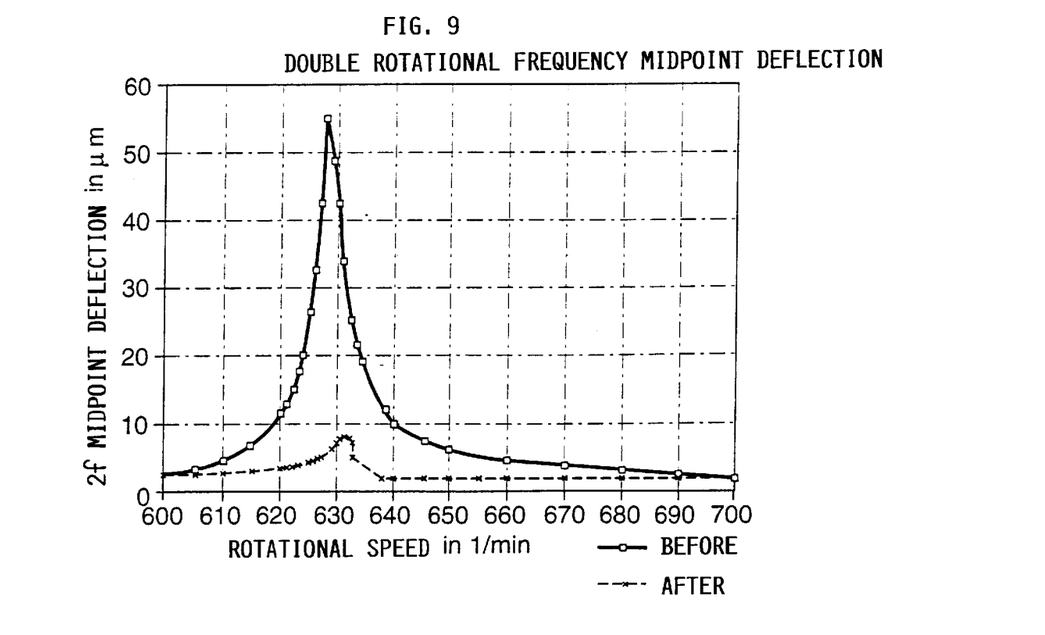
FIG. 9 is a diagram of the double frequency midpoint deflection of the rotor relative to the rotational speed before and after carrying out the anisotropy correction according to the invention.

FIG. 9 shows the double frequency midpoint deflection of a test rotor relative to its rotational speed, both before and after carrying out the method according to the invention for compensating the rotor anisotropy. As can be seen, the usable range of rotational speeds has been considerably enlarged, because excessive vibrating deflection at or about one half the first critical bending speed has been avoided. Thus, for example in the operation of a paper, film or foil manufacturing plant, the respective rolls can be operated at a higher rotational speed so as to increase the production output. Moreover, the product quality can be improved by the reduction of vibrational deflection of the rolls. If the acceptable 2f midpoint deflection is 10 µm in the example of FIG. 9, then there is absolutely no limit on the rotational speed of the roll with regard to the weight critical resonance or weight critical rotational speed.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for reducing the weight critical flexing amplitude of a flexible rotor having a flexural stiffness anisotropy, comprising the following steps:
    a) rotating said rotor about a central axis thereof and measuring a rotor deflection of said rotor during said rotating to provide measured values of rotor deflection,
    b) forming a mathematical model for representing said rotor, wherein said mathematical model comprises an equation of motion including model values of rotor deflection;
    c) evaluating said model values of rotor deflection in connection with said measured values of rotor deflection so as to minimize a difference between said model values and said measured values;
    d) defining said flexural stiffness anisotropy of said rotor by using said evaluated model values of rotor deflection in said mathematical model;
    e) calculating compensation data that reduce said defined flexural stiffness anisotropy in said mathematical model; and
    f) adjusting a configuration of said rotor in accordance with said compensation data to reduce said flexural stiffness anisotropy of said rotor.

2. The method of claim 1, wherein said minimizing of said difference in said step c) is carried out according to the least squares method.

3. The method of claim 1, wherein said compensation data are calculated in said step e) using a general stiffness characteristic of said rotor.

4. The method of claim 1, wherein said compensation data are calculated in said step e) using the mechanics law of work.

5. The method of claim 1, wherein said mathematical model is a mathematical representation of an isotropically rotatably supported non-circular flexible Laval shaft with external damping.

6. The method, of claim 1, wherein said mathematical model is a mathematical representation of a modally analyzed continuous rotor.

7. The method of claim 6, wherein said continuous rotor is analyzed by means of finite element analysis.

8. The method of claim 1, wherein said step a) further comprises sensing a rotational angular position of said rotor to provide rotational angle data correlating with said measured values of said rotor deflection, wherein said defining of said flexural stiffness anisotropy of said rotor in said step d) comprises determining a degree of flexural stiffness over a range of angular position and determining a respective angular position of at least one of a soft axis of said rotor having a lower flexural stiffness and a stiff axis of said rotor having a greater flexural stiffness by using said rotational angle data together with said evaluated model values of rotor deflection in said mathematical model, and wherein said compensation data calculated in said step e) includes said respective angular position of at least one of said soft axis and said stiff axis.

9. The method of claim 8, wherein said step of determining said degree of flexural stiffness over said range of angular position in said step d) comprises forming a Nyquist amplitude-phase diagram of an amplitude of said measured values of rotor deflection or said evaluated model values of rotor deflection relative to said rotational angle data.

10. The method of claim 8, wherein said compensation data comprises material addition data defining an addition of material to said rotor on a stiff plane defined by said stiff axis and said central axis, and wherein said adjusting of said configuration of said rotor in said step f) comprises adding additional material to said rotor on said stiff plane in accordance with said material addition data.

11. The method of claim 10, wherein said additional material has a rod shape.

12. The method of claim 10, wherein said additional material is added to said rotor at two rotationally symmetrical positions.

13. The method of claim 10, wherein said rotor has a hollow space therein, and wherein said additional material is added onto an interior wall of said rotor bounding said hollow space.

14. The method of claim 10, wherein said compensation data further comprises material removal data defining a removal of material from said rotor on a soft plane defined by said soft axis and said central axis, and wherein said adjusting of said configuration of said rotor in said step f) further comprises removing material from said rotor on said soft plane in accordance with said material removal data.

15. The method of claim 8, wherein said compensation data comprises material removal data defining a removal of material from said rotor on a soft plane defined by said soft axis and said central axis, and wherein said adjusting of said configuration of said rotor in said step f) comprises removing material from said rotor on said soft plane in accordance with said material removal data.

16. The method of claim 15, wherein said removing of material from said rotor comprises boring at least two continuous through-going holes in said rotor on said soft plane parallel to and equidistant from said central axis.

17. The method of claim 16, wherein said material removal data comprises respective data defining said angular position of said soft axis, a bore diameter of said holes, and a radial spacing of said holes relative to said central axis.

18. The method of claim 15, therein said removing of material from said rotor comprises boring at least two terminating blind holes in at least one end face of said rotor on said soft plane parallel to and equidistant from said central axis.

19. The method of claim 18, wherein said material removal data comprises respective-data defining said angular position of said soft axis, a bore diameter of said holes, a radial spacing of said holes relative to said central axis, and an axial length of said holes.

20. The method of claim 1, comprising carrying out each of said steps a), b), c), d), e) and f) only a single time and excluding repetitive iterations of said steps a)r b), c), d), e) and f) for reducing said flexural stiffness anisotropy of said rotor below an acceptable threshold.

21. The method of claim 1, wherein said adjusting of said configuration of said rotor in said step f) comprises boring at least two holes in an end face of said rotor on said soft plane parallel to and equidistant from said central axis.

22. The method of claim 1, wherein said step f) is carried out automatically by a computer numerically controlled machining apparatus responsively to said compensation data.

23. The method of claim 1, wherein said step a) comprises rotating said, rotor over a range of rotational speeds and measuring said rotor deflection respectively over said range of rotational speeds.

24. The method of claim 23, wherein said range of rotational speeds includes a speed of approximately one of the first critical bending speed of the rotor, and wherein said step of measuring said rotor deflection comprises measuring a resonant vibrating rotor deflection having a frequency twice the rotational frequency of the rotor.

* * * * *

UNITED STATES PATENT AND TRADEMARK OFFICE
CERTIFICATE OF CORRECTION

PATENT NO. : 6,044,553

DATED : Apr. 4, 2000

INVENTOR(S) : Thormann et al.

It is certified that error appears in the above-identified patent and that said Letters Patent is hereby corrected as shown below:

| | | |
|---|---|---|
| Col. 7, | line 39, | before "=", replace "B" by --G--; |
| | line 44, | in Equation (6), after "m(", replace "ρ" by --$\ddot{\rho}$--; after "+" replace "2jΩρ" by --2jΩ$\dot{\rho}$--. |
| Col. 9, | line 28, | after " "MATHLAB" ", insert --™--. |
| Col. 15, | line 21, | after "15,", replace "therein" by --wherein--; |
| Col. 16, | line 5, | after "steps", replace "a)r" by --a),--; |
| | line 18, | after "said", delete ","; |
| | line 22, | after "one", replace "of" by --half--. |

Signed and Sealed this

Twenty-seventh Day of March, 2001

*Attest:*

NICHOLAS P. GODICI

*Attesting Officer*

Acting Director of the United States Patent and Trademark Office